(12) United States Patent
Noma (10) Patent No.: US 10,656,737 B2
(45) Date of Patent: *May 19, 2020

(54) ELECTRONIC DEVICE, CONTROL DEVICE, STORAGE MEDIUM, AND CONTROL METHOD FOR CALIBRATION AFTER IMPACT DETECTION

(71) Applicant: SHARP KABUSHIKI KAISHA, Sakai, Osaka (JP)

(72) Inventor: Masatoshi Noma, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,452

(22) Filed: Dec. 29, 2018

(65) Prior Publication Data

US 2019/0220105 A1 Jul. 18, 2019

(30) Foreign Application Priority Data

Jan. 12, 2018 (JP) .................. 2018-003660

(51) Int. Cl.
*G06F 3/041* (2006.01)
*G06F 3/038* (2013.01)
(Continued)

(52) U.S. Cl.
CPC ............ *G06F 3/041* (2013.01); *G06F 1/1626* (2013.01); *G06F 1/1684* (2013.01);
(Continued)

(58) Field of Classification Search
CPC ...... G06F 3/038; G06F 3/0383; G06F 3/0346; G06F 1/1684; G06F 1/1694; G06F 1/1626; G06F 2203/0339; G06F 3/041
See application file for complete search history.

(56) References Cited

U.S. PATENT DOCUMENTS 5,982,573 A 11/1999 Henze
7,318,170 B2 1/2008 Makela et al.
(Continued)

FOREIGN PATENT DOCUMENTS

CN 101111770 A 1/2008
JP 2015-211455 A 11/2015

OTHER PUBLICATIONS

Non-Final Office Action dated Jul. 3, 2019 for U.S. Appl. No. 16/236,448.
(Continued)

*Primary Examiner* — Darlene M Ritchie
(74) *Attorney, Agent, or Firm* — ScienBiziP, P.C.

(57) ABSTRACT

The present invention achieves an electronic device that allows, even after the electronic device receives an impact, a contact detecting device to properly detect contact with an object. The electronic device includes: a contact detecting device configured to detect contact with an object; and a control device, the control device including: a determination section configured to determine whether or not a plurality of conditions are satisfied; and a calibration executing section configured to perform calibration of the contact detecting device in a case where the plurality of conditions are satisfied, the plurality of conditions including: a state where the determination section determines that an impact has been detected; and a state where the contact detecting device has not detected contact for a predetermined period or more from a time point at which the impact was detected.

7 Claims, 5 Drawing Sheets

(51) Int. Cl.
  *G06F 1/16* (2006.01)
  *G06F 3/0346* (2013.01)
(52) U.S. Cl.
  CPC ............ *G06F 1/1694* (2013.01); *G06F 3/038* (2013.01); *G06F 3/0346* (2013.01); *G06F 3/0383* (2013.01); *G06F 2203/0339* (2013.01)

(56) References Cited

U.S. PATENT DOCUMENTS

| | | | |
|---|---|---|---|
| 8,107,183 B2 | 1/2012 | Colligan | |
| 8,594,742 B2 | 11/2013 | Wulff | |
| 8,804,271 B2 | 8/2014 | Hirata | |
| 9,607,498 B2 | 3/2017 | Osorio | |
| 9,689,887 B1* | 6/2017 | Srinivas | G01B 21/18 |
| 9,838,677 B1* | 12/2017 | Ramaswamy | H04N 17/002 |
| 2007/0030159 A1 | 2/2007 | Stoev et al. | |
| 2009/0031803 A1 | 2/2009 | Noda et al. | |
| 2009/0259424 A1* | 10/2009 | Dutta | G01C 17/28 702/85 |
| 2010/0073812 A1 | 3/2010 | Shibata | |
| 2011/0277532 A1* | 11/2011 | Bartholomeyczik | G01P 15/18 73/1.38 |
| 2012/0218177 A1* | 8/2012 | Pang | G06F 3/0346 345/156 |
| 2012/0289217 A1 | 11/2012 | Riemer et al. | |
| 2013/0054180 A1* | 2/2013 | Barfield | G01P 15/0891 702/138 |
| 2013/0073095 A1 | 3/2013 | King et al. | |
| 2014/0191873 A1 | 7/2014 | Kreiner et al. | |
| 2015/0237183 A1 | 8/2015 | Novet | |
| 2015/0260754 A1* | 9/2015 | Perotti | G01P 21/00 702/96 |
| 2017/0104979 A1* | 4/2017 | Shaw | G06F 3/0346 |
| 2017/0255327 A1* | 9/2017 | Simmons | G06F 1/3262 |

OTHER PUBLICATIONS

Final Office Action dated Dec. 13, 2019 for U.S. Appl. No. 16/236,448.
Advisory Action dated Feb. 27, 2020 for U.S. Appl. No. 16/236,448.

* cited by examiner

ELECTRONIC DEVICE, CONTROL DEVICE, STORAGE MEDIUM, AND CONTROL METHOD FOR CALIBRATION AFTER IMPACT DETECTION

This Nonprovisional application claims priority under 35 U.S.C. § 119 on Patent Application No. 2018-003660 filed in Japan on Jan. 12, 2018, the entire contents of which are hereby incorporated by reference.

TECHNICAL FIELD

The present invention relates to (i) an electronic device, (ii) a control device, (iii) a control program, (iv) a storage medium in which the program is stored, and (v) a control method.

BACKGROUND ART

Conventionally, there have been known electronic devices equipped with a contact sensor that can detect a user's motion such as holding and pushing. Patent Literature 1 discloses an information processing device that makes it possible to reduce the possibilities of erroneous determination as to a contact state which erroneous determination occurs due to a change in surrounding environment.

CITATION LIST

Patent Literature

[Patent Literature 1]
Japanese Patent Application Publication Tokukai No. 2015-211455 (Publication date: Nov. 24, 2015)

SUMMARY OF INVENTION

Technical Problem

Such an electronic device disclosed in Patent Literature 1 has the following problem. That is, in a case where the electronic device has received an impact, a contact detecting device of the electronic device may continue reacting to the impact even though a user is not holding the electronic device (terminal).

An aspect of the present invention has been accomplished in view of the foregoing problem. An object of an aspect of the present invention is to realize an electronic device that allows, even after the electronic device receives an impact, a contact detecting device to properly detect contact with an object.

Solution to Problem

In order to attain the object, an electronic device in accordance with an aspect of the present invention includes: a contact detecting device configured to detect contact with an object; and a control device, the control device including: a determination section configured to determine whether or not a plurality of conditions are satisfied; and a calibration executing section configured to perform calibration of the contact detecting device in a case where the plurality of conditions are satisfied, the plurality of conditions including: a state where the determination section determines that an impact has been detected; and a state where the contact detecting device has not detected contact for a predetermined period or more from a time point at which the impact was detected.

Further, in order to attain the object, a control device in accordance with an aspect of the present invention is a control device for controlling an electronic device, the electronic device including a contact detecting device configured to detect contact with an object, the control device including: a determination section configured to determine whether or not a plurality of conditions are satisfied; and a calibration executing section configured to perform calibration of the contact detecting device in a case where the plurality of conditions are satisfied, the plurality of conditions including: a state where the determination section determines that an impact has been detected; and a state where the contact detecting device has not detected contact for a predetermined period or more from a time point at which the impact was detected.

Further, in order to attain the object, a method in accordance with an aspect of the present invention is a method of controlling an electronic device, the electronic device including: a contact detecting device configured to detect contact with an object; and a control device, the method including the steps of: determining whether or not a plurality of conditions are satisfied; and performing calibration of the contact detecting device in a case where the plurality of conditions are satisfied, the plurality of conditions including: a state where the control device determines that an impact has been detected; and a state where the contact detecting device has not detected contact for a predetermined period or more from a time point at which the impact was detected.

Advantageous Effects of Invention

An aspect of the present invention brings about an effect that an electronic device allows, even after the electronic device receives an impact, a contact detecting device to properly detect contact with an object.

DESCRIPTION OF EMBODIMENTS

Embodiment 1

The following description will discuss an embodiment of the present invention in detail. Note that descriptions of configurations, which are described in specific items (embodiments) below but are identical with those described in the other items, may be omitted. For convenience, members having the same functions as those described in different items are given the same reference signs and their descriptions will be omitted.

The electronic device specified herein can be any device having a portion to be held by a user. Examples of such an electronic device include a smartphone, a mobile phone, a tablet terminal, a remote control, a hair dryer, and a vacuum cleaner.

[Electronic Device]

Figure 1:
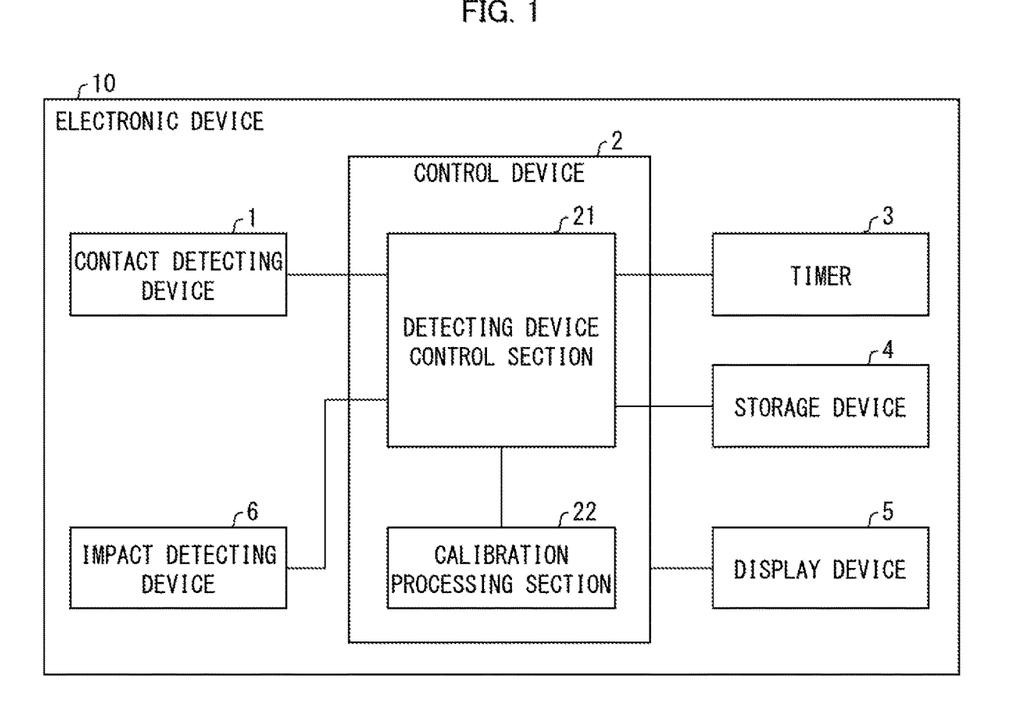
FIG. 1 is a block diagram illustrating a schematic configuration of an electronic device in accordance with an embodiment of the present invention.

The following description will discuss an example in which an electronic device 10 is a smartphone. However, the electronic device 10 is not limited to such a device. As illustrated in FIG. 1, the electronic device 10 includes a contact detecting device 1, a control device 2, a timer 3, a storage device 4, a display device 5, and an impact detecting device 6.

The contact detecting device 1 can mainly detect that the contact detecting device 1 is being held by a user. The contact detecting device 1 can be, for example, a device for determining the degree of pressure applied or a device for detecting a distortion or warp of the electronic device 10 caused by a change in pressure. More specifically, the contact detecting device 1 can be a sensor for detecting contact with an object such as a user's hand. Examples of the sensor include a pressure sensor, a piezoelectric sensor, and an electrostatic sensor (3D force sensor). The contact detecting device has an output value. The output value is, for example, a value which is (i) obtained by converting, into numerical form, a signal received by the contact detecting device 1 through contact and then (ii) supplied from the contact detecting device 1 to a detecting device control section 21.

The impact detecting device 6 can detect that the electronic device 10 has received an impact. The impact detecting device 6 detects an acceleration of the electronic device 10. The impact detecting device 6 can be, for example, an acceleration sensor. The impact detecting device has an output value. The output value is, for example, a value which is (i) obtained by converting, into numerical form, a signal received by the impact detecting device 6 through an impact and then (ii) supplied from the impact detecting device 6 to the detecting device control section 21.

The control device 2 centrally controls individual sections of the electronic device 10. In Embodiment 1, the control device 2 particularly includes the detecting device control section (determination section) 21 and a calibration processing section (calibration executing section) 22. Functions of the detecting device control section 21 and the calibration processing section 22 are described in detail later.

The timer 3 measures time. The timer 3 can be realized by, for example, a real time clock (RTC) integrated circuit (IC) for measuring time. Further, the timer 3 is configured, by way of example, so as to supply a notification signal (alarm) to the detecting device control section 21 when a predetermined amount of time has elapsed since time measurement started in response to an instruction from the detecting device control section 21.

The storage device 4 stores various types of data and various types of programs. The storage device 4 can be configured by, for example, a non-volatile storage device such as a hard disk, a flash memory, and a ROM. In the storage device 4, for example, the following values are stored in advance: (i) a reference value that is an output value outputted by the contact detecting device 1 while the contact detecting device 1 is not in contact with an object or the like, (ii) a contact threshold value concerning an output value of the contact detecting device 1, and (iii) an impact threshold value concerning an output value of the impact detecting device 6. The detecting device control section 21 can read a stored value from and write a value into the storage device 4.

The reference value indicates a value outputted by the contact detecting device while a casing of the electronic device 10 is not held by a user. The contact threshold value is a threshold value for determining whether or not the contact detecting device 1 is in contact with an object. The contact threshold value is set in accordance with the reference value. The impact threshold value is a threshold value for determining the occurrence of a rapid change in speed of the electronic device 10 which change takes place, for example, in a case where the electronic device 10 is dropped or hit by a foreign matter.

For the display device 5, for example, a liquid crystal panel is used. Note that a display panel to be used for the display device 5 is not limited to the liquid crystal panel but can be an organic electroluminescence (EL) panel, an inorganic EL panel, a plasma panel, or the like.

The detecting device control section 21 controls operations of both the contact detecting device 1 and the impact detecting device 6. In particular, the detecting device control section 21 determines whether or not the following two conditions (1) and (2) are satisfied: (1) the impact detecting device 6 detects an impact not smaller than a predetermined value, i.e., outputs a value larger than the impact threshold value stored in the storage device 4 and (2) the contact detecting device 1 has not detected any contact for a predetermined period or more from a time point at which the impact was detected.

In a case where it is determined that the conditions (1) and (2) are both satisfied, the calibration processing section 22 performs a calibration process.

In a specific example of the calibration process, the calibration processing section 22 sets, as a reference value of the contact detecting device, the output value outputted by the contact detecting device after the impact was detected. In this way, the calibration processing section 22 performs calibration of the contact detecting device 1.

In a case where the conditions (1) and (2) are both satisfied, it is considered that the electronic device 10 is not being held by a user but is continuing to receive a physical pressure, due to, for example, deformation of the casing of the electronic device 10. In such a case, the contact detecting device 1 continues reacting albeit not in contact with an object. Even in this case, calibrating an output value of the contact detecting device 1 makes it possible to properly detect contact with an object.

In addition, the calibration processing section 22 can further determine whether or not the following condition (3) is satisfied: (3) a difference between the value outputted by the contact detecting device 1 after the impact was detected and the reference value stored in the storage section is not smaller than a predetermined value. For example, the calibration processing section 22 can perform calibration in a case where it is determined that the condition (3) is satisfied in addition to the conditions (1) and (2). Note that the predetermined value can be a fixed value or can be set as appropriate in accordance with, for example, how the electronic device 10 is expected to be used.

Figure 2:
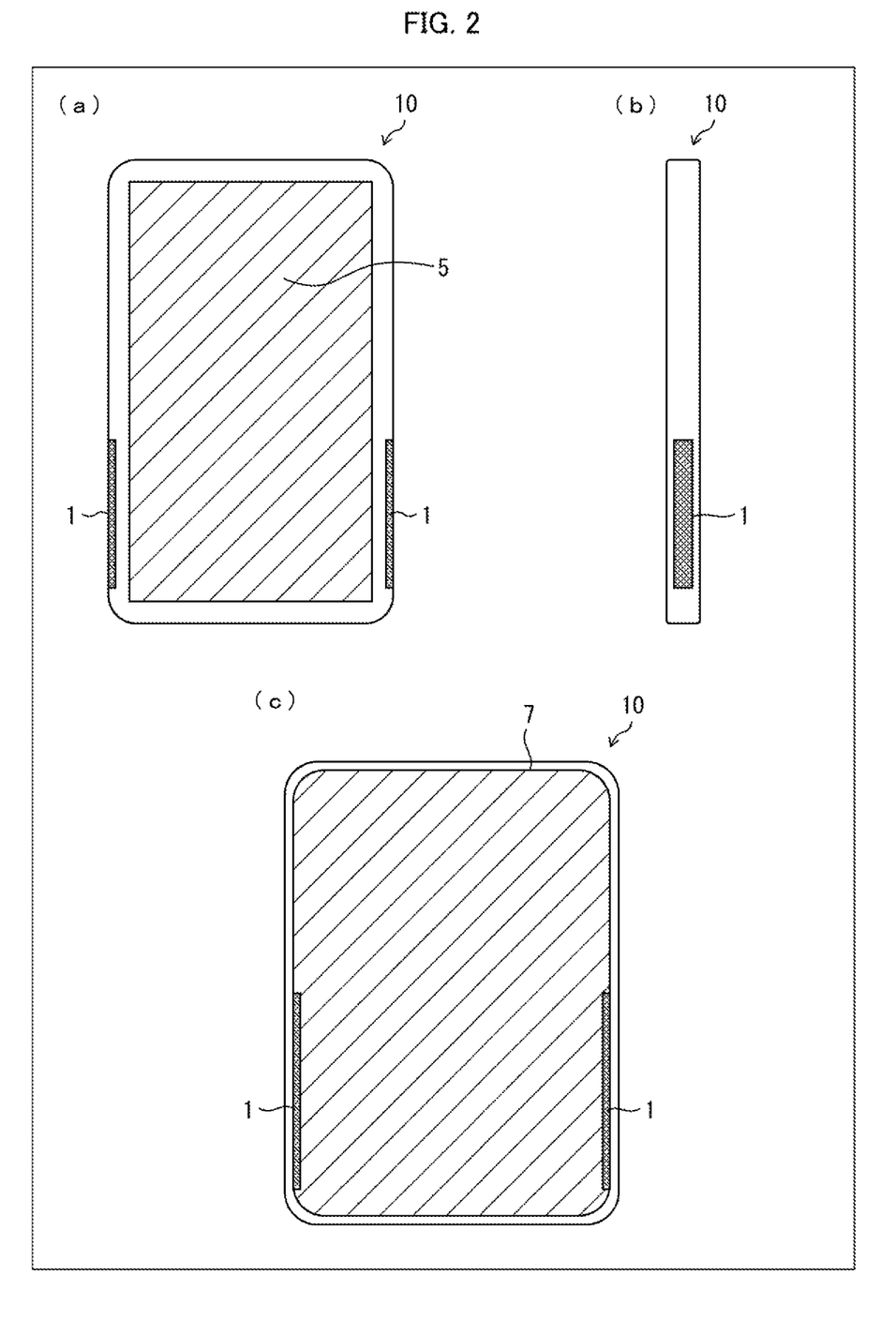
FIG. 2 illustrates an appearance of the electronic device.

FIG. 2 is a schematic view illustrating an appearance of the electronic device 10 in accordance with Embodiment 1. The electronic device 10 includes the display device 5 (e.g., a touch panel) provided on at least one surface of the casing. Note that the surface on which the display device 5 is provided as illustrated in (a) of FIG. 2 will be referred to as a "front surface" of the electronic device 10. The electronic device 10 also includes contact detecting devices 1 provided so as to come into contact with a user's hand which holds the casing of the electronic device 10.

As illustrated in (a) and (b) of FIG. 2, the electronic device 10 includes, for example, two contact detecting devices 1 provided on respective two surfaces adjacent to the long sides of the front surface (hereinafter the two surfaces will be referred to as "side surfaces" of the electronic device 10). Note that the number and layout of contact detecting devices 1 are not limited to those illustrated in (a) and (b) of FIG. 2. For example, a plurality of contact detecting devices 1 can be provided on each of the side surfaces. Alternatively, a contact detecting device 1 can be provided over the entire side surface.

Moreover, the contact detecting device 1 can be exposed to the outside of the casing. Alternatively, the contact detecting device 1 can be provided inside a casing 7 as illustrated in (c) of FIG. 2. In other words, it is only necessary to provide the contact detecting device 1 so as to correspond to a user's hand which holds the casing 7. Other than these examples, the contact detecting device 1 can be provided, for example, below a power button/volume button/"Home" button (not illustrated), or below the display panel (touch panel).

Figure 3:
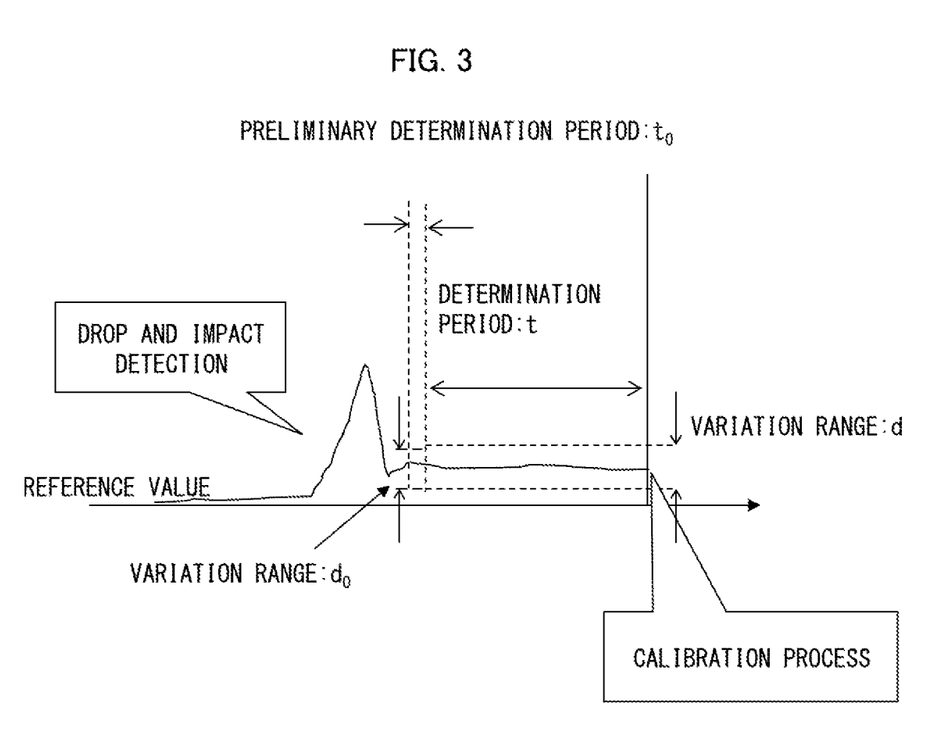
FIG. 3 is a diagram for explaining an operation of the electronic device.

FIG. 3 is a graph showing a relationship between (i) an output value of the contact detecting device 1 and (ii) time. A preliminary determination period $t_0$ is used for determining whether or not variations in the output value of the contact detecting device 1 have been restrained. In a case where the variations have fallen within a variation range do within the preliminary determination period $t_0$, the detecting device control section 21 determines that the variations have been restrained.

A subsequent determination period t is used for determining whether or not a user is holding the electronic device 10. In a case where variations in the output value of the contact detecting device 1 have fallen within a variation range d over the determination period t, the detecting device control section 21 determines that a user is not holding the electronic device 10. In contrast, in a case where there is a variation in the output value which variation falls outside the variation range d during the determination period t, the detecting device control section 21 determines that a user is holding the electronic device 10. This is because the output value is considered to vary by a certain amount or more while a user is touching the contact detecting device 1 (holding the electronic device 10). Specifically, it can be determined that a user is holding the electronic device 10 in a case where (i) the output value of the contact detecting device 1 exceeds a preset contact threshold value and (ii) the output value continues to vary by a certain amount or more over a certain period.

[First Operation Example of Operation of Electronic Device (Method of Controlling Electronic Device 10)]

Next, a first operation example of an operation of the electronic device 10 will be described with reference to a flowchart of FIG. 4. Following a start of use of the electronic device 10, the process proceeds to Step S1 (hereinafter the term "Step" will be omitted).

In S1, the detecting device control section 21 causes the storage device 4 to store, in advance, an output value of the contact detecting device 1 (hereinafter such an output value will be referred to as "sensor value"), i.e., a reference value.

In S2, the detecting device control section 21 determines whether or not an output value of the impact detecting device 6 has rapidly changed. This corresponds to determining whether or not the electronic device 10 (terminal) has received an impact due to, for example, being dropped. In a case where the output value of the impact detecting device 6 exceeds a preset impact threshold value in S2, the process proceeds to S3. In contrast, in a case where the output value is not larger than the impact threshold value in S2, the process returns to S1.

In S3, the detecting device control section 21 determines whether or not variations in the sensor value have continuously fallen within the variation range do (over the preliminary determination period $t_0$). This corresponds to determining whether or not the variations in the sensor value are restrained. In a case where the variations in the sensor value have continuously fallen within the variation range $d_0$ over the preliminary determination period $t_0$ in S3, the process proceeds to S4. In contrast, in a case where there is a variation in the sensor value which variation falls outside the variation range $d_0$ during the preliminary determination period $t_0$ in S3, the process returns to S1. In S4, the detecting device control section 21 activates the timer 3, and the process proceeds to S5.

In S5, the detecting device control section 21 determines whether or not the variations in the sensor value have fallen within the variation range d over a certain period (the determination period t). This corresponds to determining whether or not a user holds the electronic device 10. In a case where the variations in the sensor value have fallen within the variation range d over the predetermined period (the determination period t) in S5, the process proceeds to S6. In contrast, in a case where there is a variation in the sensor value which variation falls outside the variation range d during the determination period t in S5, the process proceeds to S8. In S8, the timer 3 is initialized, and the process returns to S1.

In S6, the detecting device control section 21 compares the sensor value examined in S5 with the reference value stored in the storage device 4 in advance. In a case where a difference between these values is not smaller than a predetermined value, the process proceeds to S7. In contrast, in a case where the difference is smaller than the predetermined value, the process proceeds to S8. In S8, the timer 3 is initialized, and the process returns to S1.

In S7, the calibration processing section 22 performs calibration. Specifically, the calibration processing section changes the reference value of the contact detecting device 1 so as to calibrate the sensor value. For example, the calibration processing section 22 can calculate an average of sensor values outputted during the determination period t and set the average as a new reference value. This ends the process of FIG. 4.

Embodiment 2

The following description will discuss Embodiment 2. Note that, for convenience, members having the same functions as those described in Embodiment 1 are given the same reference numerals and their descriptions will be omitted.

In Embodiment 2, in a storage device 4, a threshold value (change-amount threshold value) concerning an amount of change in output value of the contact detecting device 1 is stored in advance, in addition to a reference value that is a value outputted by a contact detecting device 1 while the contact detecting device 1 is not being in contact with an object or the like. Note that the amount of change in output value refers to an amount of change in the output value of the contact detecting device 1 per unit time. The threshold value concerning the amount of change is used to determine the occurrence of a rapid change in output value per unit time, which change takes place, for example, in a case where an electronic device 10 is dropped or hit by a foreign matter. Note that the unit time can be set as appropriate in accordance with a design of the electronic device 10. For example, in a case where the electronic device 10 is designed such that an output value of the contact detecting device 1 is read every 0.01 seconds, the unit time can be set to, for example, 0.01 seconds.

In Embodiment 2, in a case where the amount of change in output value of the contact detecting device 1 exceeds the change-amount threshold value, a control device 2 determines that an impact has been detected.

A detecting device control section 21 determines whether or not the following two conditions (1) and (2) are both satisfied: (1) the contact detecting device 1 has detected an impact and (2) the contact detecting device 1 has not detected any contact for a predetermined period or more from a time point at which the impact was detected.

[Second Operation Example of Operation of Electronic Device (Method of Controlling Electronic Device 10)]

Figure 4:
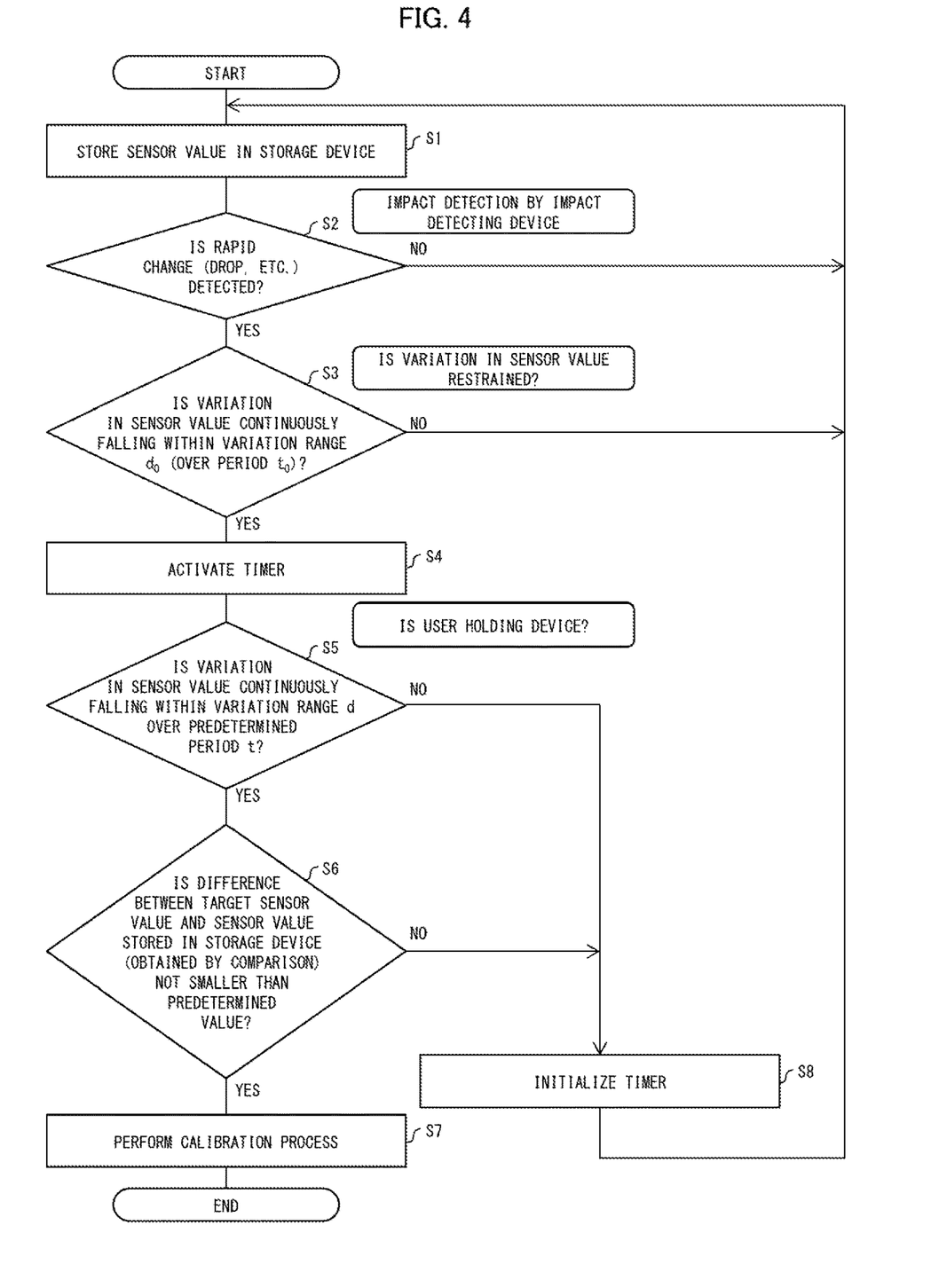
FIG. 4 is a flowchart illustrating an example of a flow of the operation of the electronic device.

In Embodiment 2, a calibration process is performed so that the following procedure is performed to carry out S2 of the flowchart in FIG. 4, which is discussed in Embodiment 1.

Specifically, in S2, the detecting device control section 21 determines whether or not the output value of the contact detecting device 1 has rapidly changed. This corresponds to determining whether or not the electronic device 10 (terminal) has received an impact, due to, for example, being dropped.

In Embodiment 2, the detecting device control section 21 follows a process similar to that described in Embodiment 1 except S2 above.

In Embodiment 2, the electronic device 10 may or may not include an impact detecting device 6. Assume a case where (i) the electronic device 10 includes the impact detecting device 6 and (ii) and the impact detecting device 6 has not detected an impact but the contact detecting device 1 has detected an impact. In this case as well, the detecting device control section 21 can determine that the electronic device has received the impact. Alternatively, the contact detecting device 1 and the impact detecting device 6 can both serve to detect an impact applied to the electronic device 10.

[Third Operation Example of Electronic Device (Method of Controlling Electronic Device 10)]

Figure 5:
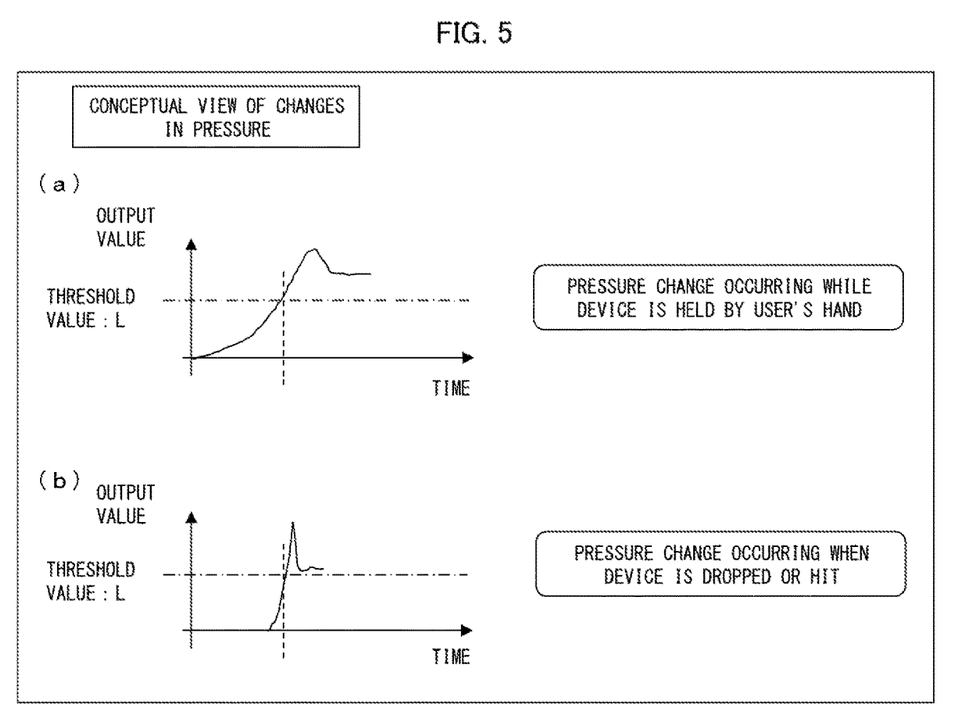
FIG. 5 is a diagram for explaining the operation of the electronic device.

FIG. 5 is a conceptual view showing changes in pressure. (a) and (b) of FIG. 5 are graphs each showing a relationship between (i) an output value of the contact detecting device 1 and (ii) time. Specifically, (a) of FIG. 5 is a graph showing pressure changes which occur in a case where the electronic device 10 is held by a user's hand. (b) of FIG. 5 is a graph showing pressure changes which occur in a case where the electronic device 10 is dropped or hit by a foreign matter.

According to the graph of (a) of FIG. 5, the output value of the contact detecting device 1 changes relatively slowly after exceeding a threshold value L (contact threshold value). In contrast, according to the graph of (b) of FIG. 5, the output value of the contact detecting device 1 changes relatively rapidly after exceeding the threshold value L (contact threshold value). Hence, calculating an amount of change in output value of the contact detecting device 1 makes it possible to determine, in accordance with a calculated amount of change, whether (i) the electronic device 10 is held by a user or (ii) the electronic device 10 is dropped or hit by a foreign matter.

According to Embodiment 2, an impact can thus be suitably detected by reference to an amount of change in output value of the contact detecting device 1.

Embodiment 3

The following description will discuss Embodiment 3. Note that, for convenience, members having the same functions as those described in Embodiments 1 and 2 are given the same reference numerals and their descriptions will be omitted.

In Embodiment 3, a calibration processing section 22 can change a contact threshold value instead of calibrating an output value of the contact detecting device 1 through changing a reference value. The contact threshold value is changed to a value that prevents contact with an object from being detected by reference to a value outputted during a determination period t as illustrated in FIG. 3. This allows the contact detecting device 1 to properly detect, as in Embodiments 1 and 2, contact with an object even while the contact detecting device 1 is continuing to receive a physical pressure. For example, the calibration processing section 22 can produce a new contact threshold value by (i) calculating an average of sensor values outputted during the determination period t and (ii) adding, to the average, a difference between a contact threshold value and a reference value which are stored in a storage device 4 in advance.

Embodiment 4: Software Implementation Example

Control blocks of a control device 2 of an electronic device 10 (particularly, a detecting device control section 21 and a calibration processing section 22) can be realized by a logic circuit (hardware) provided in an integrated circuit (IC chip) or the like or can be alternatively realized by software.

In the latter case, the control device 2 includes a computer that executes instructions of a program that is software realizing the foregoing functions. The computer includes, for example, at least one processor (control device) and also includes at least one computer-readable storage medium in which the program is stored. An object of an aspect of the present invention can be achieved by the processor of the computer reading and executing the program stored in the storage medium. The processor can be, for example, a central processing unit (CPU). Examples of the storage medium encompass "a non-transitory tangible medium" such as a tape, a disk, a card, a semiconductor memory, and a programmable logic circuit as well as a read only memory (ROM). In addition, the computer may further include, for example, a random access memory (RAM) into which the above program is loaded in an executable form. The program can be supplied to or made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

[Recap]

An electronic device (10) in accordance with a first aspect of the present invention includes: a contact detecting device (1) configured to detect contact with an object; and a control device (2), the control device including: a determination section (21) configured to determine whether or not a plurality of conditions are satisfied; and a calibration executing section (22) configured to perform calibration of the contact detecting device in a case where the plurality of conditions are satisfied, the plurality of conditions including: a state where the determination section determines that an impact has been detected; and a state where the contact detecting device has not detected contact for a predetermined period or more from a time point at which the impact was detected.

The configuration allows the contact detecting device to properly detect contact with an object even after the electronic device has received an impact.

In a second aspect of the present invention, an electronic device (10) is configured to further include, in the first aspect, an impact detecting device (6), and the electronic device (10) is configured such that in a case where an output value of the impact detecting device is larger than a predetermined impact threshold value, the determination section determines that an impact has been detected.

The configuration allows the contact detecting device to properly detect contact with an object even after the electronic device has received an impact.

In a third aspect of the present invention, an electronic device (10) is configured such that, in the first or second aspect, in a case where an amount of change in an output value of the contact detecting device (1) is larger than a predetermined change-amount threshold value, the determination section determines that an impact has been detected.

The configuration allows the contact detecting device to properly detect contact with an object even after the electronic device has received an impact.

In a fourth aspect of the present invention, an electronic device (10) is configured such that, in any one of the first to third aspects, the plurality of conditions further includes a state where a difference between an output value of the contact detecting device (1) and a reference value stored in a storage device (4) is not smaller than a predetermined value.

The configuration allows the contact detecting device to properly detect contact with an object even after the electronic device has received an impact.

In a fifth aspect of the present invention, an electronic device (10) is configured such that, in any one of the first to fourth aspects, the calibration of the contact detecting device performed by the calibration executing section (22) includes setting, as a reference value of the contact detecting device (1), an output value of the contact detecting device which output value is obtained after the impact was detected.

The configuration allows the contact detecting device to properly detect contact with an object even after the electronic device has received an impact.

A control device (2) in accordance with a sixth aspect of the present invention is a control device for controlling an electronic device, the electronic device including a contact detecting device (1) configured to detect contact with an object, the control device including: a determination section (21) configured to determine whether or not a plurality of conditions are satisfied; and a calibration executing section (22) configured to perform calibration of the contact detecting device in a case where the plurality of conditions are satisfied, the plurality of conditions including: a state where the determination section determines that an impact has been detected; and a state where the contact detecting device has not detected contact for a predetermined period or more from a time point at which the impact was detected.

The configuration allows the contact detecting device to properly detect contact with an object even after the electronic device has received an impact.

The control device in accordance with each of the foregoing aspects of the present invention may be realized by a computer. In this case, the scope of the present invention also encompasses: (i) a control program for controlling the control device, which control program causes a computer to operate as each of the calibration executing section and the determination section (serving as software elements) included in the control device so that the control device can be realized by the computer; and (ii) a computer-readable storage medium in which the control program is stored.

A method in accordance with a seventh aspect of the present invention is a method of controlling an electronic device, the electronic device including: a contact detecting device (1) configured to detect contact with an object; and a control device (2), the method including the steps of: determining whether or not a plurality of conditions are satisfied; and performing calibration of the contact detecting device in a case where the plurality of conditions are satisfied, the plurality of conditions including: a state where the control device determines that an impact has been detected; and a state where the contact detecting device has not detected contact for a predetermined period or more from a time point at which the impact was detected.

The configuration allows the contact detecting device to properly detect contact with an object even after the electronic device has received an impact.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Contact detecting device
2 Control device
3 Timer
4 Storage device
5 Display device
6 Impact detecting device
7 Casing
10 Electronic device
21 Detecting device control section (determination section)
22 Calibration processing section (calibration executing section)

The invention claimed is:

1. An electronic device comprising:
a contact detecting device configured to detect contact with an object; and
a control device,
the control device including:
determination circuitry configured to determine whether or not a plurality of conditions are satisfied; and
calibration executing circuitry configured to perform calibration of the contact detecting device in a case where the plurality of conditions are satisfied,
the plurality of conditions including:
a state where the determination circuitry determines that an impact has been detected; and
a state where the contact detecting device has not detected contact for a predetermined period or more from a time point at which the impact was detected;
wherein the calibration of the contact detecting device performed by the calibration executing circuitry includes changing a reference value of the contact detecting device by setting, as the reference value, an output value of the contact detecting device where the output value is obtained after the impact was detected.

2. The electronic device as set forth in claim 1, further comprising an
impact detecting device,
the electronic device being configured such that in a case where an output value of the impact detecting device is larger than a predetermined impact threshold value, the determination circuitry determines that an impact has been detected.

3. The electronic device as set forth in claim 1, wherein in a case where an amount of change in an output value of the contact detecting device is larger than a predetermined change-amount threshold value, the determination section circuitry determines that an impact has been detected.

4. The electronic device as set forth in claim 1, wherein the plurality of conditions further include a state where a difference between an output value of the contact detecting device and a reference value stored in a storage device is not smaller than a predetermined value.

5. A non-transitory computer-readable storage medium in which a control program is stored, the control program being configured to cause a computer to function as each of calibration executing circuitry and determination circuitry of the electronic device recited in claim 1.

6. A control device for controlling an electronic device, said electronic device comprising:
a contact detecting device configured to detect contact with an object,
said control device comprising:
determination circuitry configured to determine whether or not a plurality of conditions are satisfied; and
a calibration of the contact detecting device in a case where the plurality of conditions are satisfied,
the plurality of conditions including:
a state where the determination circuitry determines that an impact has been detected; and
a state where the contact detecting device has not detected contact for a predetermined period or more from a time point at which the impact was detected;
wherein the calibration of the contact detecting device performed by a calibration executing circuitry includes changing a reference value of the contact detecting device by setting, as the reference value, an output value of the contact detecting device where the output value is obtained after the impact was detected.

7. A method of controlling an electronic device,
said electronic device comprising:
a contact detecting device configured to detect contact with an object; and
a control device,
said method comprising the steps of:
determining whether or not a plurality of conditions are satisfied; and
performing calibration of the contact detecting device in a case where the plurality of conditions are satisfied,
the plurality of conditions including:
a state where the control device determines that an impact has been detected; and
a state where the contact detecting device has not detected contact for a predetermined period or more from a time point at which the impact was detected;
wherein the calibration of the contact detecting device performed by a calibration executing circuitry includes changing a reference value of the contact detecting device by setting, as the reference value, an output value of the contact detecting device where the output value is obtained after the impact was detected.

* * * * *